United States Patent
Soreefan et al.

(10) Patent No.: US 9,170,135 B2
(45) Date of Patent: *Oct. 27, 2015

(54) MODULE FOR GAS FLOW MEASUREMENTS WITH A DUAL SENSING ASSEMBLY

(71) Applicant: Itron, Inc., Liberty Lake, WA (US)

(72) Inventors: Ibne Soreefan, Union, KY (US); Orion Baker, Frankfort, KY (US)

(73) Assignee: ITRON, INC., Liberty Lake, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/797,343

(22) Filed: Mar. 12, 2013

(65) Prior Publication Data

US 2014/0260665 A1    Sep. 18, 2014

Related U.S. Application Data

(63) Continuation-in-part of application No. 13/663,819, filed on Oct. 30, 2012.

(51) Int. Cl.
| | |
|---|---|
| *G01F 1/20* | (2006.01) |
| *G01F 1/32* | (2006.01) |
| *G01F 7/00* | (2006.01) |
| *G01F 15/00* | (2006.01) |
| *G01F 15/06* | (2006.01) |
| *G01D 4/00* | (2006.01) |

(52) U.S. Cl.
CPC ............... *G01F 1/20* (2013.01); *G01F 1/3227* (2013.01); *G01F 7/00* (2013.01); *G01F 15/006* (2013.01); *G01F 15/061* (2013.01); *G01F 15/065* (2013.01); *G01D 4/00* (2013.01)

(58) Field of Classification Search
None
See application file for complete search history.

(56) References Cited

U.S. PATENT DOCUMENTS

| | | | | |
|---|---|---|---|---|
| 3,640,133 | A | | 2/1972 | Adams |
| 4,550,614 | A | | 11/1985 | Herzl |
| 4,911,007 | A | * | 3/1990 | Churchill et al. ............... 73/202 |
| 5,003,810 | A | * | 4/1991 | Jepson et al. .................. 73/196 |
| 5,063,786 | A | * | 11/1991 | Sanderson et al. ......... 73/861.19 |
| 5,157,974 | A | * | 10/1992 | Hattori et al. ............. 73/861.19 |
| 5,218,872 | A | * | 6/1993 | Hattori et al. ............. 73/861.19 |
| 5,298,886 | A | | 3/1994 | Ueki et al. |
| 5,309,770 | A | * | 5/1994 | Okabayashi .............. 73/861.19 |
| 5,339,695 | A | * | 8/1994 | Kang et al. ................ 73/861.19 |

(Continued)

FOREIGN PATENT DOCUMENTS

JP    2003090746 A    3/2003

OTHER PUBLICATIONS

PCT Search Report and Written Opinion mailed Jul. 14, 2014 for PCT Application No. PCT/US14/21909, 10 Pages.
Cascetta, et al., "The Future Domestic Gas Meter: Review of Current Developments," Measurement, Apr. 1994, vol. 13, No. 2, pp. 129-145, Amsterdam, NL, copyright 1994, Elsevier Science B.V., 17 pages.

(Continued)

*Primary Examiner* — Harshad R Patel (57) ABSTRACT

Disclosed are apparatus and methodology for measuring gas flow using a modular unit as a gas measurement module. The modular unit can be made of molded plastic, cast metal, or other material. A gas meter can include the gas measurement module. The gas measurement module includes a chamber with an inlet and an outlet. An obstacle in the chamber is configured to generate an oscillating gas jet when gas flow into the chamber is at or above a threshold flow rate. The gas measurement module includes a dual sensing assembly with one or more first sensors using a first gas flow sensing technology and one or more second sensors using a second gas flow sensing technology.

20 Claims, 9 Drawing Sheets

(56) References Cited

U.S. PATENT DOCUMENTS

| | | | |
|---|---|---|---|
| 5,684,472 | A | 11/1997 | Bane |
| 6,250,132 | B1 | 6/2001 | Drzewiecki |
| 6,321,790 | B1 | 11/2001 | Carver et al. |
| 6,860,157 | B1 * | 3/2005 | Yang et al. .......... 73/861.19 |
| 6,895,069 | B2 | 5/2005 | Kim |
| 7,481,119 | B2 * | 1/2009 | Yang et al. .......... 73/861.19 |
| 7,861,585 | B2 | 1/2011 | Muraoka et al. |
| 7,895,904 | B2 | 3/2011 | Matsubara et al. |
| 8,069,734 | B2 | 12/2011 | Oda et al. |
| 8,091,434 | B2 | 1/2012 | Vaidya |
| 8,334,787 | B2 | 12/2012 | Bushman et al. |
| 8,833,390 | B2 | 9/2014 | Ball et al. |
| 2004/0244498 | A1 | 12/2004 | Chen et al. |
| 2014/0118162 | A1 * | 12/2004 | Chen et al. .......... 73/861.19 |

OTHER PUBLICATIONS

International Search Report for International Application No. PCT/US2013/051612, mailed Feb. 10, 2014, 4 pages.

Written Opinion for International Application No. PCT/US2013/051612, mailed Feb. 10, 2014, 7 pages.

Non Final Office Action for U.S. Appl. No. 13/663,819, mailed Mar. 9, 2015, 27 pages.

International Preliminary Report on Patentability for International Application No. PCT/US2013/051612, dated May 14, 2015, 8 pages.

Final Office Action for U.S. Appl. No. 13/663,819, dated Jun. 18, 2015, 24 pages.

Notice of Allowance for U.S. Appl. No. 13/663,819, dated Sep. 15, 2015, 10 pages.

* cited by examiner

MODULE FOR GAS FLOW MEASUREMENTS WITH A DUAL SENSING ASSEMBLY

This application is a continuation-in-part of U.S. patent application Ser. No. 13/663,819 entitled "Hybrid Sensor System for Gas Flow Measurements," filed Oct. 30, 2012, which is incorporated herein by reference.

BACKGROUND

Gas meters are widely used in residential, commercial, and industrial settings to measure gas consumption. Regardless of quantity or quality of the gas, meters use the volume of the gas passing through the meter in the measurement. However, variables, such as temperature and pressure, can affect the gas flow through the meter and ultimately, the resulting measurement.

Conventionally, gas meters have often included a fluid oscillator sensor. In a meter having a fluid oscillator, gas is directed into a cavity through a nozzle. An obstacle is disposed opposite the output of the nozzle creating a two-dimensional fluid jet that oscillates, as well understood by those of ordinary skill in the art, transversely about a longitudinal axis when gas flows into the cavity at an adequate pressure (in other words, at a sufficient rate of flow). By detecting the frequency of the oscillation of the jet, a flow rate of the gas can be determined. However, when gas flows through the meter at a pressure less than the pressure needed to generate an oscillating jet, for example, such as only at a rate necessary to light a pilot light, such known metering apparatus cannot accurately measure the consumption.

In another conventional approach, a fluid oscillator can detect a greater range of gas flow rates using a single device that measures the frequency of an oscillating fluid jet and a temperature sensor that can be used to determine a flow rate. Such arrangement is generally only for residential settings and requires on the premises calibration. Because the composition and properties of gas differ from each source, significant time, complexity, and cost are utilized to calibrate each temperature sensor individually.

Existing meters include multiple complex assemblies of many parts that are costly and prone to wear and failure. While various implementations of gas meter systems have been developed, and while various combinations of gas flow detection exist, no design has emerged that generally encompasses all of the desired characteristics as hereafter presented in accordance with the subject technology.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps.

DETAILED DESCRIPTION

Overview

As discussed above, existing meters include multiple complex assemblies of many parts that are costly and prone to wear and failure. This application describes a modular measurement module for measuring gas flow. The modular measurement module is a modular unit, preferably a molded plastic modular unit. Due to the modular nature of the measurement module, there are no moving parts, as can be found in measurement devices of existing meters. Since there is no mechanical wear, gas flow measurements are more stable over time than with existing meters. This also allows for lower maintenance costs.

The modular nature of the measurement module also provides for highly automated meter proving. Furthermore, the modular nature of the module lowers manufacturing costs, transportation costs, and installation costs.

This application also describes improved methodology and corresponding and/or associated apparatus and systems for detecting gas flow in a gas meter system. One exemplary embodiment of the presently disclosed subject matter relates to a method for measuring gas flow in a meter. Such an exemplary methodology may preferably comprise directing gas through the meter at various flow rates and detecting a gas flow of the gas with a first sensor when the gas is directed at a low flow rate. The exemplary methodology also comprises detecting an oscillation frequency of the gas with a second sensor when the gas is directed at a rate to produce an oscillating fluid jet of gas. The exemplary methodology further comprises determining flow rate based on outputs of at least one of such first sensor and such second sensor.

Multiple and varied example implementations and embodiments are described below. However, these examples are merely illustrative, and other implementations and embodiments may be used to safely remotely connect and disconnect electricity service to a site, even when an electricity meter or other network computing device is not accessible at the site without departing from the scope of the claims.

Example Network of Meters

Figure 1:
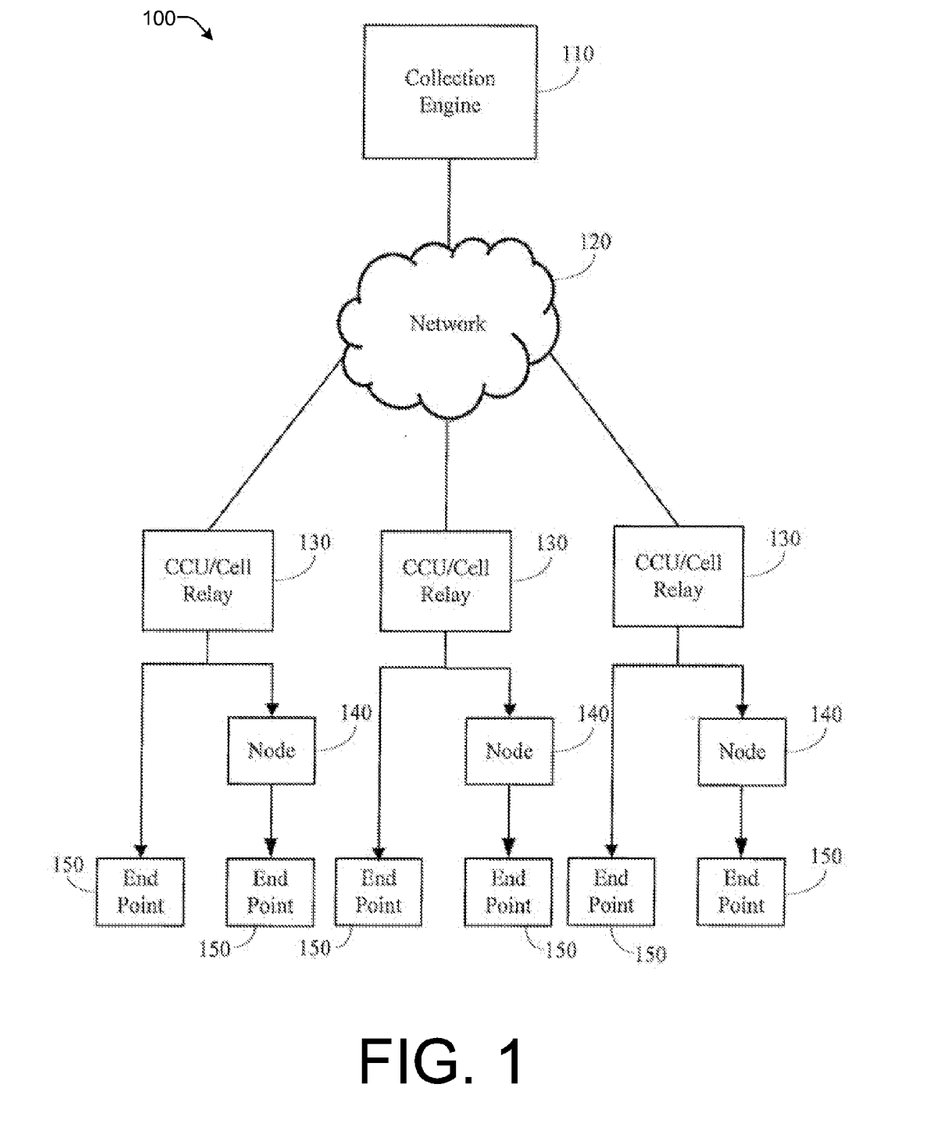
FIG. 1 depicts an exemplary communication network system according to an exemplary embodiment of the present disclosure.

Referring now to the drawings, FIG. 1 illustrates an exemplary communication network system according to an exemplary embodiment of the present disclosure. The network system can be, for example, a bi-directional communication network system generally 100 that can include a collection engine 110, a network 120, cell control units (CCUs) or cell relays 130, nodes 140, and endpoints 150.

The collection engine 110 can act as a central database that knows all the addresses of each element of the network as well as saving the information provided from all the elements of the network. Information transmission or requests can be initiated by or at the collection engine 110 or by any element in the network. In a metrology network, collection engine 110 can be located at a utility premises and can be a single device or a plurality of devices coupled together. It can collect meter readings from one or more of the endpoints to monitor and manage utility usage as well as to compile bills based on the usage.

Network 120 connects the collection engine with the rest of the network. The network 120 can correspond to any type of communication connection, now or later known, such as wireless, internet, Ethernet, fiber optics, or the like. A protocol can be used in network 120 to communicate information.

CCUs or cell relays 130 can act as gateways or junctions between the nodes 140 and endpoints 150 of the network and the collection engine 110. Network devices can be arranged in cells and the CCU/cell relay 130 can include the addresses of each device in the respective cell in a routing table, or other arrangements may be provided. CCU/cell relay 130 can transmit information in two directions, upstream to the collection engine 110 and/or downstream to the nodes 140 and endpoints 150. Upstream packets can include, for example, an uplink message, a broken link message, and/or an outage notification while downstream packets can include, for example, a downlink message and a broadcast message. In a metrology network, the CCU/cell relay 130 can initiate communications with endpoints 150 to collect meter readings, or to communicate when a broken link has occurred and a new communication path needs to be determined.

In a metrology network, endpoints 150 can be meter reading devices (electricity, gas, water, or the like) to transmit and/or to receive metering information. Nodes 140 can also be meter reading devices and/or they can be network devices that enhance communications, such as a repeater or a meter reading device with repeater capabilities. While only a few representative endpoints are illustrated in FIG. 1, there can be as many endpoints and nodes as necessary to communicate within the network. In addition, a plurality of endpoints and nodes can be variously coupled to form a communication path to the CCU/cell relay 130. The number and connection paths are not intended to be limited by the representative illustration in FIG. 1.

Example Utility Meter

Figure 2:
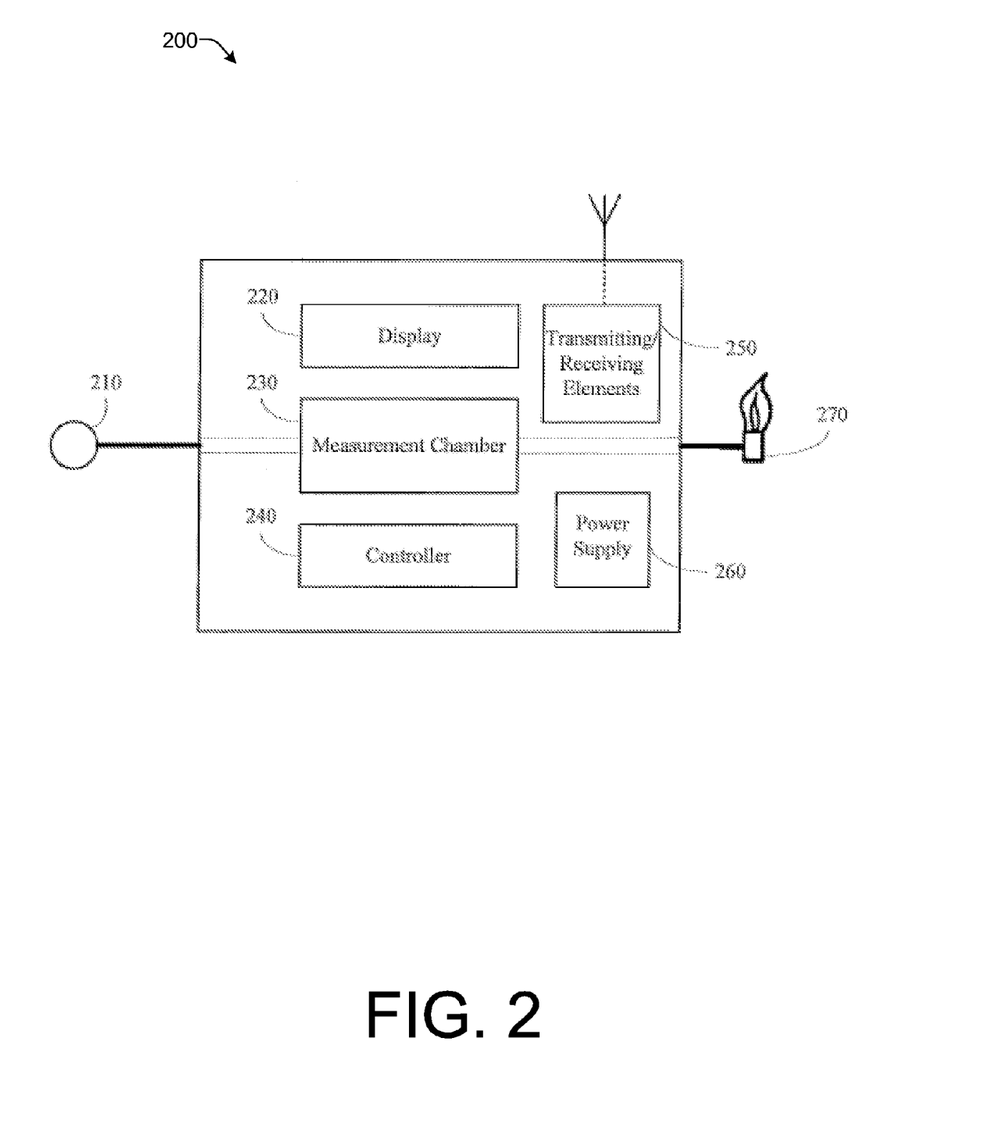
FIG. 2 depicts an exemplary utility meter configuration according to an exemplary embodiment of the present disclosure.

FIG. 2 depicts an exemplary utility meter configuration according to an exemplary embodiment of the present disclosure. The utility meter generally 200 can include a display 220, a measurement chamber 230, a controller 240, transmitting and/or receiving elements 250, and power supply 260.

Display 220 can provide visual information to display to a user (or record keeper). The display 220 can be a digital display or an electro-mechanical display. The visual information can include various characters and/or symbols. For instance, time and date can be displayed on display 220. Alternatively, current usage values may also be displayed to a user on display 220.

A source 210 is coupled with meter 200 to provide a commodity for measurement. For instance, a fluid source such as gas or water can be coupled with the meter to measure a commodity supplied to the premises. The commodity passes through measurement chamber 230 to the commodity usage access point 270 of the associated premises. For instance, when source 210 is a gas source, usage access point 270 can be a pilot light as represented in FIG. 2 (not labeled).

As the fluid passes through the measurement chamber 230, a flow rate can be determined in order to calculate usage of the commodity. The controller 240 can use the flow rate information to calculate commodity usage. Alternatively, controller 240 can save flow rate information and transmit the flow rate information using the transmitting elements 250 to supply the information over the network to a collection engine.

The meter 200 can also include a power supply 260 to provide power to any or all elements of the meter. The power supply 260 can be a battery or a connection to an external power source. For example, power supply 260 can provide power to the display 220, any elements in the measurement chamber 230, the controller 240, and/or the transmitting/receiving elements 250.

Transmitting/receiving elements 250 can include any elements necessary to transmit information over the network. For instance, transmitting/receiving elements 250 can include an antenna (represented but not labeled in FIG. 2). An antenna can be disposed internally within the meter housing, embedded in the housing itself, or can be disposed externally to the meter and otherwise coupled to the transmitting/receiving elements 250.

A given meter 200 can be used in a wide variety of applications including residential, commercial, and/or industrial settings. The flow rates for each setting are vastly different. For example, in residential settings, flow rates may generally be approximately 0.125 to 500 cubic feet per hour (CFH), while in commercial settings the flow rates may typically be approximately 1.5 to 1100 CFH, and while in industrial settings the flow rates may be approximately 1 to 4200 CFH. The sensing elements of meter 200 may generally be the same for all such applications. Such arrangement allows for a single flow rate detection configuration to be used in a wide range of applications.

Due to the unique makeup of the gas mixture in each environment, calibration can be performed at the premises to improve flow rate determination. Each gas mixture includes different combinations of properties that can affect the flow rate. Accordingly, after meter 200 is installed at the premises, a calibration method can be performed in order to determine the unique gas mixture for the specific environment at the premises. Such information can be advantageously stored in the controller 240 and used to determine flow rate at a particular installation.

Example Measurement Chamber

Figure 3:
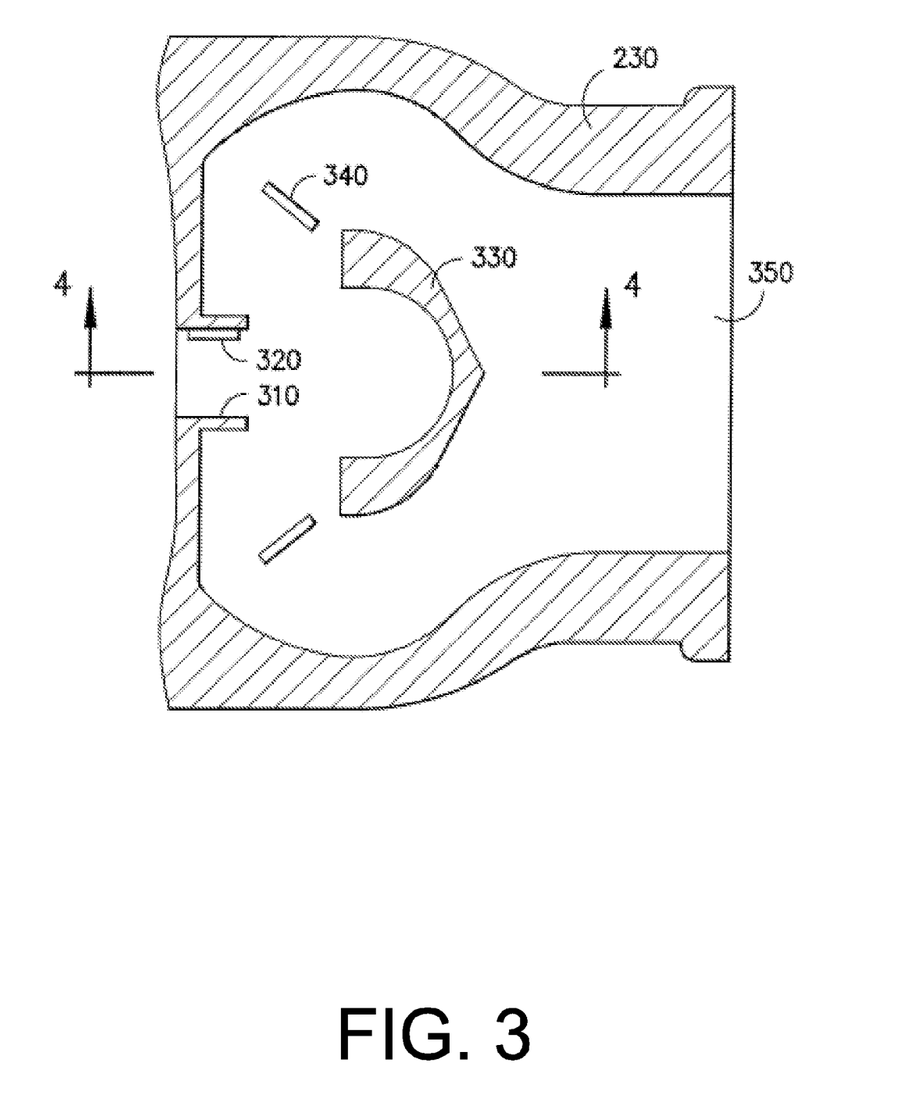
FIG. 3 depicts a cross-sectional view of an exemplary measurement chamber of a utility meter according to an exemplary embodiment of the present disclosure.
Figure 4:
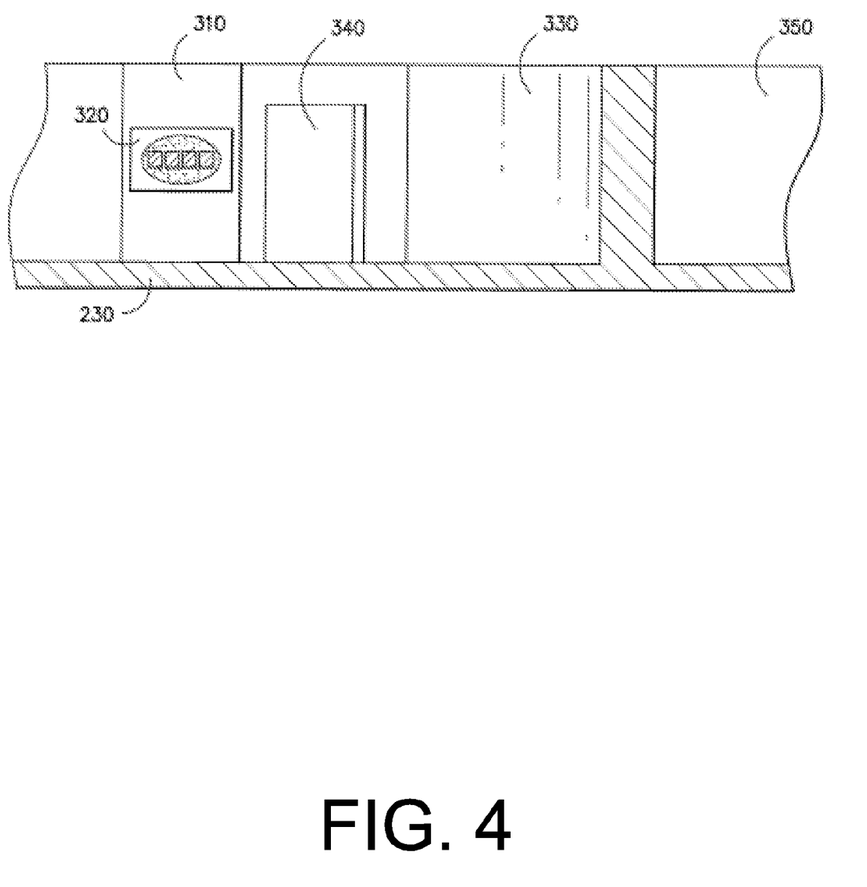
FIG. 4 depicts a cross-sectional view of an exemplary measurement chamber of a utility meter according to an exemplary embodiment of the present disclosure, taken along a section line 4-4 as illustrated in present FIG. 3.

FIGS. 3 and 4 depict cross-sections of an exemplary measurement chamber generally 230 according to an exemplary embodiment of the present disclosure. The measurement chamber is part of a modular unit, preferably made of molded plastic. However, cast metal or other materials may be used. The modular unit may only comprise the measurement chamber. Alternatively, the modular unit may comprise additional features. The measurement chamber 230 can include a nozzle 310, a low flow rate sensor 320, an obstruction 330, a pair (respective first and second) of oscillating fluid jet sensors 340, and an outlet 350.

Fluid enters measurement chamber 230 from a source through a nozzle 310. Measurement chamber 230 can be a fluidic oscillator and can have any shape, arrangement, and or configuration such that an oscillating fluid jet can be generated when the fluid enters the chamber at certain flow rates (those sufficient for a given chamber design to generate such oscillation). The fluid can pass into the measurement chamber 230 at various flow rates. In an exemplary system, a low flow rate can be associated with a rate used to maintain a flame at the pilot light. A medium flow rate, for example, can be associated with hot water heater use, while a high or maximum flow rate can be associated with a maximum usage demand on the premises.

When a fluid such as gas is introduced into the chamber 230 at a low flow rate, there is not sufficient (that is not enough) pressure (flow of gas) to generate an oscillating jet flow. In accordance with the presently disclosed subject matter, in order to detect the flow rate of the gas at a low flow rate, a low flow rate sensor 320 is disposed parallel to the gas flow in the nozzle 310. The low flow rate sensor 320 can be a thermal flow sensor and include sensing elements that can detect the temperature of the gas and the velocity of the gas. For instance, to determine the flow rate of the gas, the flow rate sensor 320 can detect a velocity in the gas based on a change in voltage over the surface of the sensor 320.

Gas can be measured in cubic feet per hour (CFH) with the density of the gas correlated to the temperature of the gas. When the gas is at a lower temperature, the gas is denser than at higher temperatures, which means that more gas can occupy the same volume at lower temperatures. In order to improve consumption calculations, the temperature of the gas can be used to determine a flow rate. For instance, a change in resistance value can be detected at sensor 320. The change in resistance can be indicative of the temperature of the fluid flowing through the meter. Such value then can be used to select an algorithm, equation, model, and/or look-up table to be used in calculating the flow rate.

When the fluid is introduced into the chamber 230 at a rate high enough (sufficient) to generate an oscillating jet flow, the fluid sweeps over the surface of the obstacle 330 during oscillation and the frequency of oscillation is detected by oscillating fluid jet sensors 340. The obstacle 330 can have any shape, arrangement, or configuration such that an oscillating jet is produced when the fluid jet (under sufficient pressure or rate of flow) strikes the obstruction.

Oscillating fluid jet sensors 340 can be, for example, piezo-film sensors. As the oscillating jet flow oscillates from one extreme position to another, the voltage on the sensor changes. The oscillating fluid jet sensors 340 can detect the oscillating frequency of the oscillating fluid jet because as the jet comes into contact with the sensor, the voltage on the sensor changes, creating an output signal indicative of the frequency. For instance, in accordance with presently disclosed subject matter, when the oscillating jet flow is in a first extreme position, the oscillating jet flow contacts a first oscillating fluid jet sensor such that the oscillating jet flow is only in communication with the first oscillating fluid jet sensor. Similarly, when the fluid jet oscillates to a second extreme position, the oscillating jet flow only contacts the second oscillating fluid jet sensor.

The output signals of oscillating fluid jet sensors 340 can be processed using various techniques. For instance, the output signal can be filtered and/or amplified. The amount of processing, such as amplification, can correlate to the flow rate. For instance the higher the flow rate, the less amplification used, while the lower the flow rate, the more amplification used.

Example Measurement Control System

Figure 5:
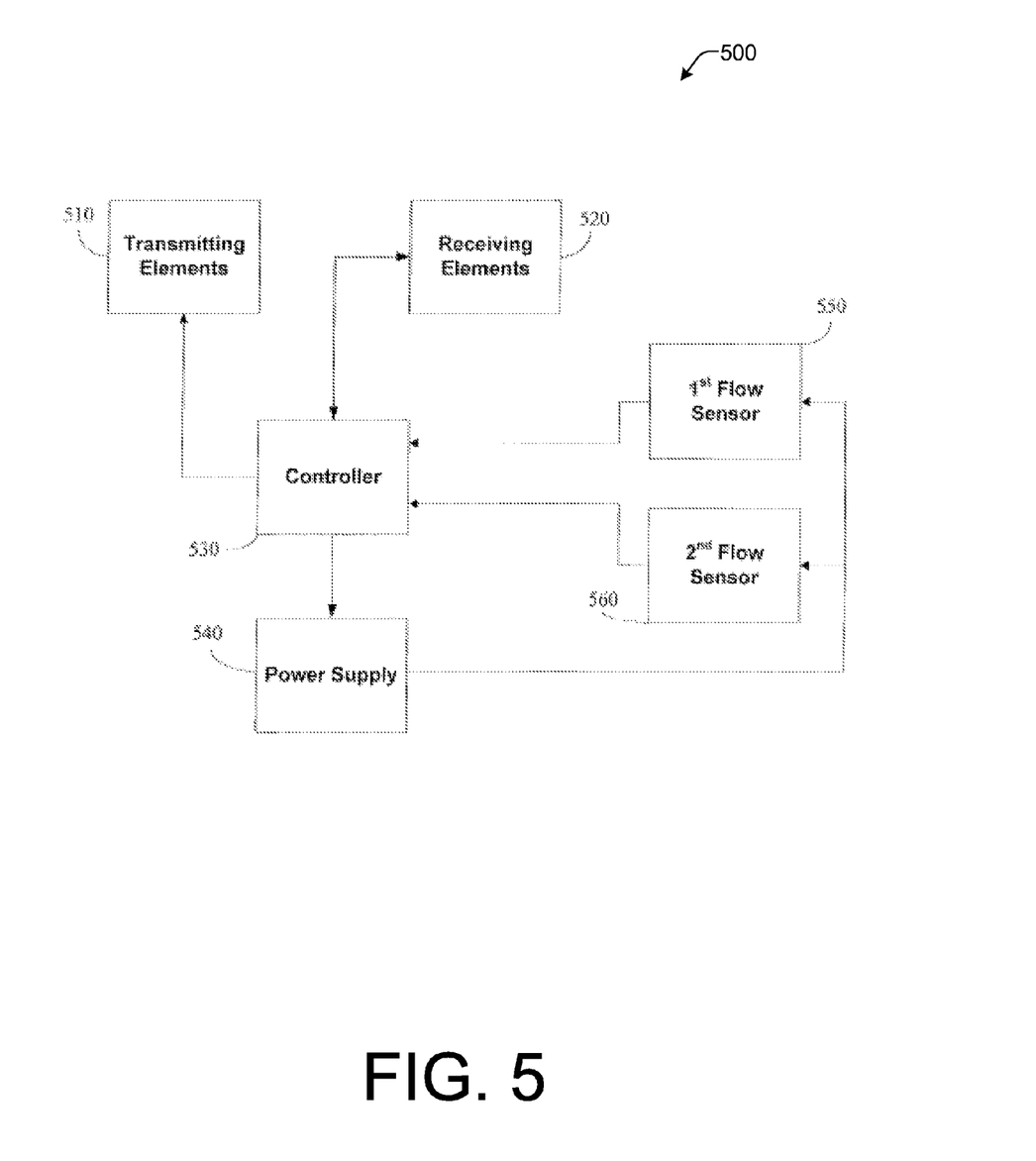
FIG. 5 depicts a block diagram of an exemplary measurement control system according to an exemplary embodiment of the present disclosure.

FIG. 5 depicts a block diagram of an exemplary measurement control system generally 500 according to an exemplary embodiment of the present disclosure. The measurement control system 500 can include transmitting elements 510, receiving elements 520, controller 530, power supply 540, a designated first flow sensor 550, and a designated second flow sensor 560.

Controller 530 can include a memory and one or more processing devices such as microprocessors, CPUs or the like, such as general or special purpose microprocessors operable to execute programming instructions or micro-control code associated with commodity measurement and transmission of such information over a network. The memory can represent random access memory such as DRAM, or read only memory such as ROM or FLASH. In one exemplary embodiment, the processor may execute programming instructions stored in memory. The memory can be a separate component from the processor or can be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform control functionality instead of relying upon software. In other embodiments, various hybrids of hard-wired functionality versus software-driven implementations may be practiced, as will be understood by those of ordinary skill in the art without requiring further discussion of such details.

The representative controller 530 can be coupled with the first flow sensor 550 and the second flow sensor 560. As the fluid enters the measurement chamber at a low flow rate, the controller 530 can initiate power to the first flow sensor 550 from power supply 540. Controller 530 monitors the output of the first flow sensor 550 to determine the flow rate at which the fluid is passing through the chamber.

The flow rate can be determined using a detected temperature of the gas, a detected velocity of the gas, and/or a detected frequency of the gas. The detected temperature, velocity, and/or frequency can be applied to an algorithm, equation, model, and/or look up table to determine the flow rate, details of which form no particular aspect of the presently disclosed subject matter.

The determined flow rate can be compared with a predetermined threshold. For instance, the predetermined threshold can be a fraction of the maximum flow rate such as $\frac{1}{10}$ of the maximum flow rate. The predetermined threshold can be a single value or a range of values. First flow sensor 550 and second flow sensor 560 can have an overlapping flow rate detection range. The predetermined threshold can be selected to be between the overlapping flow rate detection ranges.

When the detected flow rate is below the predetermined threshold, the. controller 530 can control the power supply 540 to supply power to the first flow sensor 550. When the detected flow rate exceeds the predetermined threshold, the controller 530 can control the power supply 540 to discontinue power to the first flow sensor 550 and to supply power to the second flow sensor 560.

The controller 530 can determine a flow rate based on the outputs of at least one of the first flow sensor 550 and the second flow sensor 560. The flow rate can be determined based on each output or the outputs can be considered together to determine an overall flow rate.

The flow rate can be indicative of the amount of commodity use by the premises. For instance, the flow rate can be used to determine the amount of gas used in ft/hour (CFH).

After the flow rate is determined, such information can be transmitted over the network using transmitting elements 510. The flow rate can be compiled for billing purposes at the meter or the flow rate can be transmitted to a central database to compile billing information.

Figure 6:
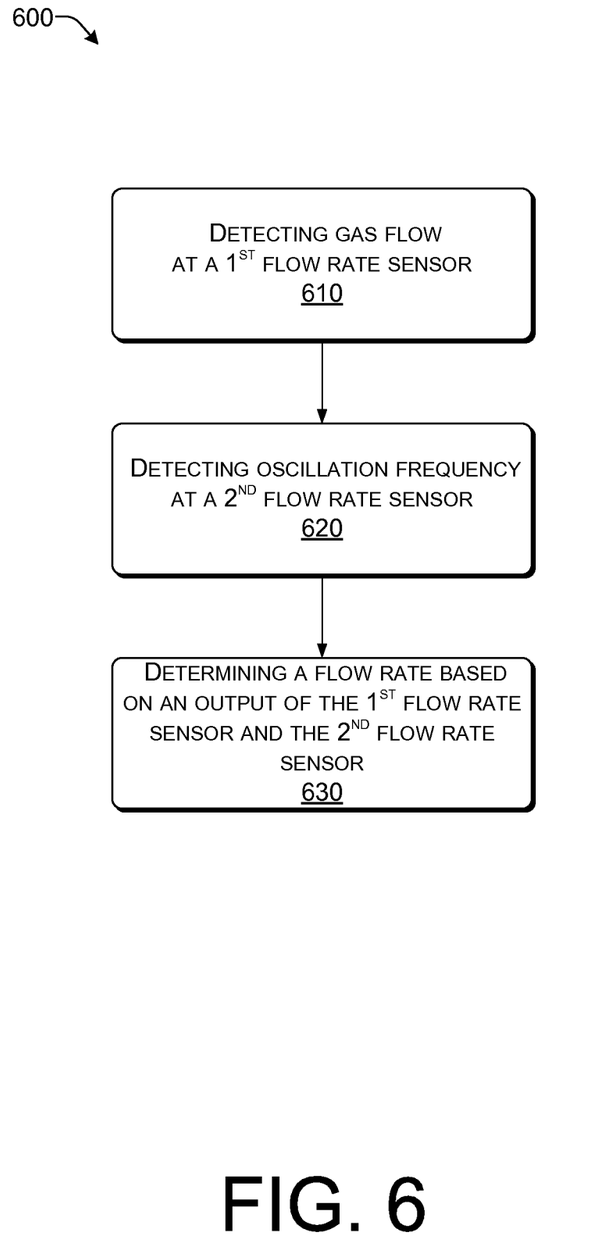
FIG. 6 depicts a flow chart of an exemplary method of detecting usage according to an exemplary embodiment of the present disclosure.
Figure 7:
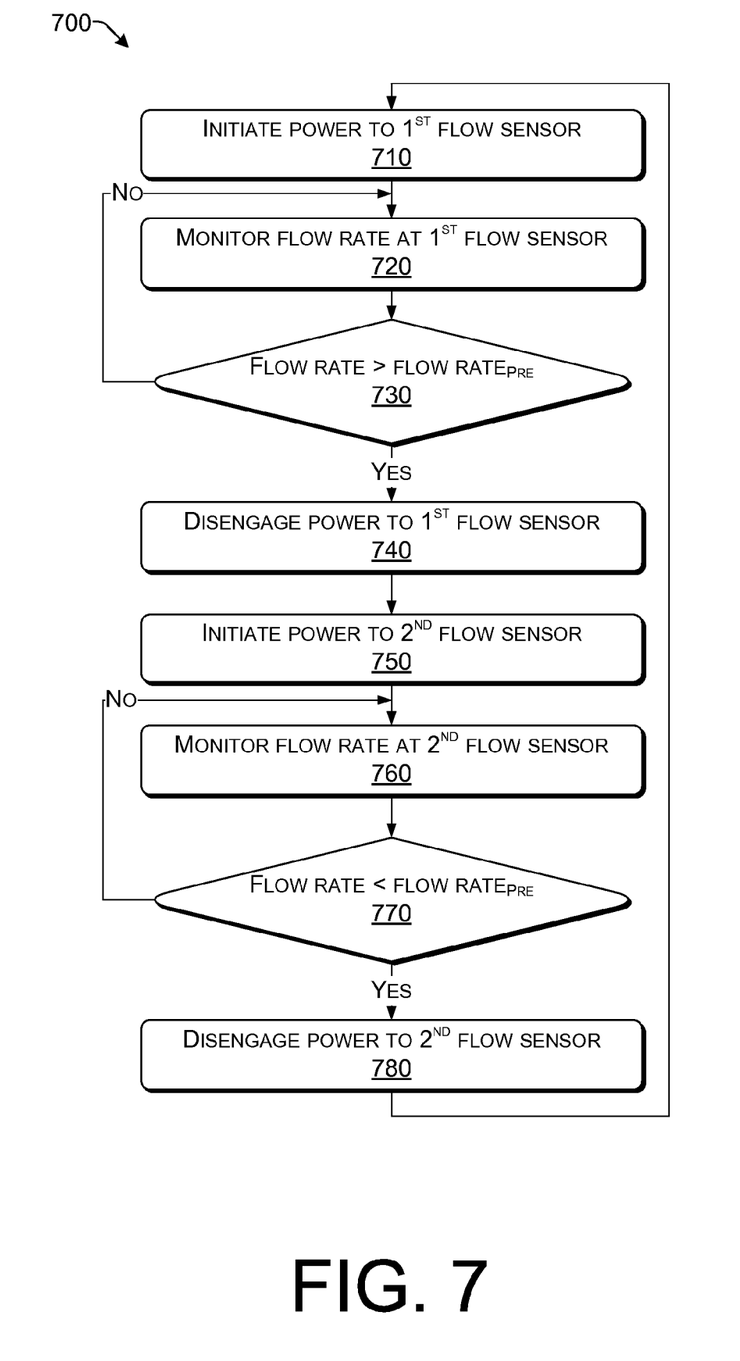
FIG. 7 depicts a flow chart of an exemplary method of detecting usage according to an exemplary embodiment of the present disclosure.

FIGS. 6 and 7 depict respective flow charts of exemplary methods generally 600 and 700 according to exemplary embodiments of the present disclosure. The methods 600 and 700 can be implemented with any suitable system including a fluid or commodity measurement device. In addition, although FIGS. 6 and 7 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Example Methods of Detecting Flow Rate with Measurement Chamber

FIG. 6 depicts a flow chart associated with a method generally 600 of detecting a flow rate. At step 610, gas flow can be detected at a first flow rate sensor. When the gas flow achieves a pressure high enough (in other words, sufficient) to generate an oscillating fluid jet, the oscillation frequency can be detected at the second flow rate sensor in step 620. Those of ordinary skill in the art will understand that the precise pressure or rate of flow necessary to achieve such oscillation will depend at least in part on the arrangement of the overall measurement chamber and related physicality of cooperating components thereof. The output of the first flow rate sensor or of the second flow rate sensor can be used to determine the flow rate at step 630.

FIG. 7 depicts a flow chart associated with another presently disclosed exemplary method generally 700 of detecting a flow rate. At step 710, power is initiated to the first flow sensor. The flow rate is monitored at the first flow rate sensor in step 720, and the flow rate is compared to a predetermined threshold in step 730. When the flow rate exceeds the predetermined threshold, power to the first flow sensor is disengaged per step 740, and power is initiated at the second flow sensor per step 750. The flow rate is monitored at the second flow rate sensor per step 760, and the flow rate is compared to the predetermined threshold per step 770. When the flow rate monitored at the second flow rate sensor is less than the predetermined threshold, power to the second flow sensor is disengaged per step 780.

Example Utility Meter Configuration

Figure 8:
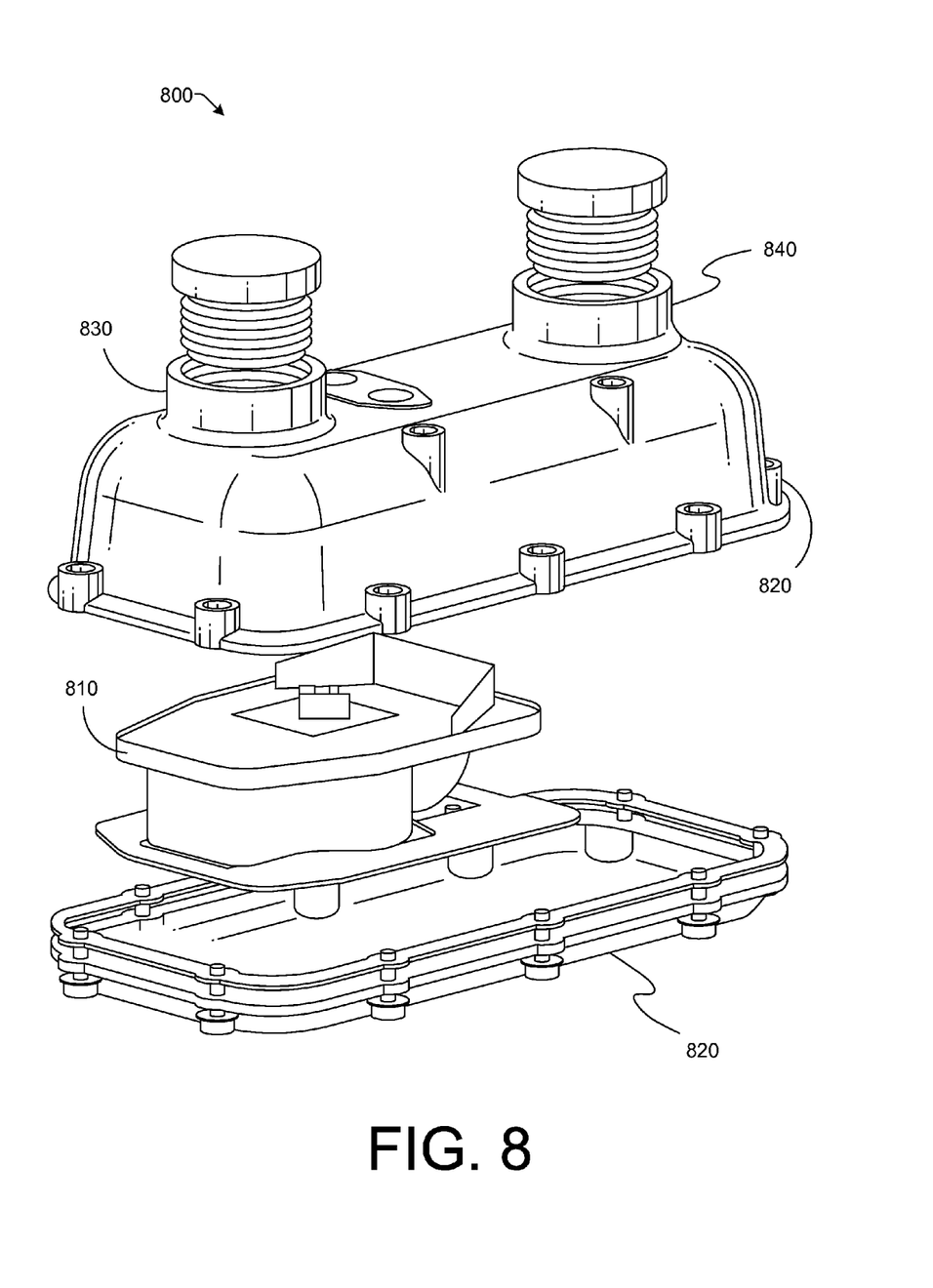
FIG. 8 depicts an exemplary utility meter configuration according to an exemplary embodiment of the present disclosure.

FIG. 8 depicts an exemplary utility meter configuration according to an exemplary embodiment of the present disclosure. Meter 800 is an example of meter 200 of FIG. 2. Meter 800 includes modular unit 810. In the example, modular unit 810 includes measurement chamber 230 of FIG. 2, FIG. 3, and FIG. 4. Modular unit 810 is preferably a molded plastic enclosure. Any other material suitable for use in a gas meter may be used to create the enclosure, such as cast metal. Advantages of using a molded plastic enclosure or cast metal enclosure include low cost of manufacturing, transportation, and installation. Because of the modular nature of the molded plastic enclosure, there are a low number of parts in meter 800 compared to other types of meters. Furthermore, there is little to no mechanical wear during use of the meter, which allows stability of measurement results over long periods of time and across a range of temperatures. The modular nature of the molded plastic enclosure also allows for highly automated meter proving.

Meter 800 includes housing 820. In the example, housing 820 is made of a top and bottom portion that can be joined to enclose modular unit 810. However, any other suitable number of components may be used to form housing 820. The housing may be made of cast metal, such as aluminum. However, any other material suitable for a gas meter housing may be used.

Housing includes inlet 830 for directing gas into meter 800 and outlet 840 for directing gas out of meter 800. In the example, gas is directed from inlet 830 to an inlet of chamber 230 (i.e., nozzle 310 of FIG. 3 and FIG. 4). Gas is then directed through chamber 230, then through an outlet of chamber 230 (i.e., outlet 350 of FIG. 3 and FIG. 4), and finally through outlet 840 of housing 820, to exit meter 800. Inlet 830 and outlet 840 may be configured to allow pipes to be fitted into them. In the example, inlet 830 is on the same side of housing 820 as outlet 840, which allows for a simpler installation processes compared to other gas meters.

Example Method of Detecting Flow Rate with Utility Meter

Figure 9:
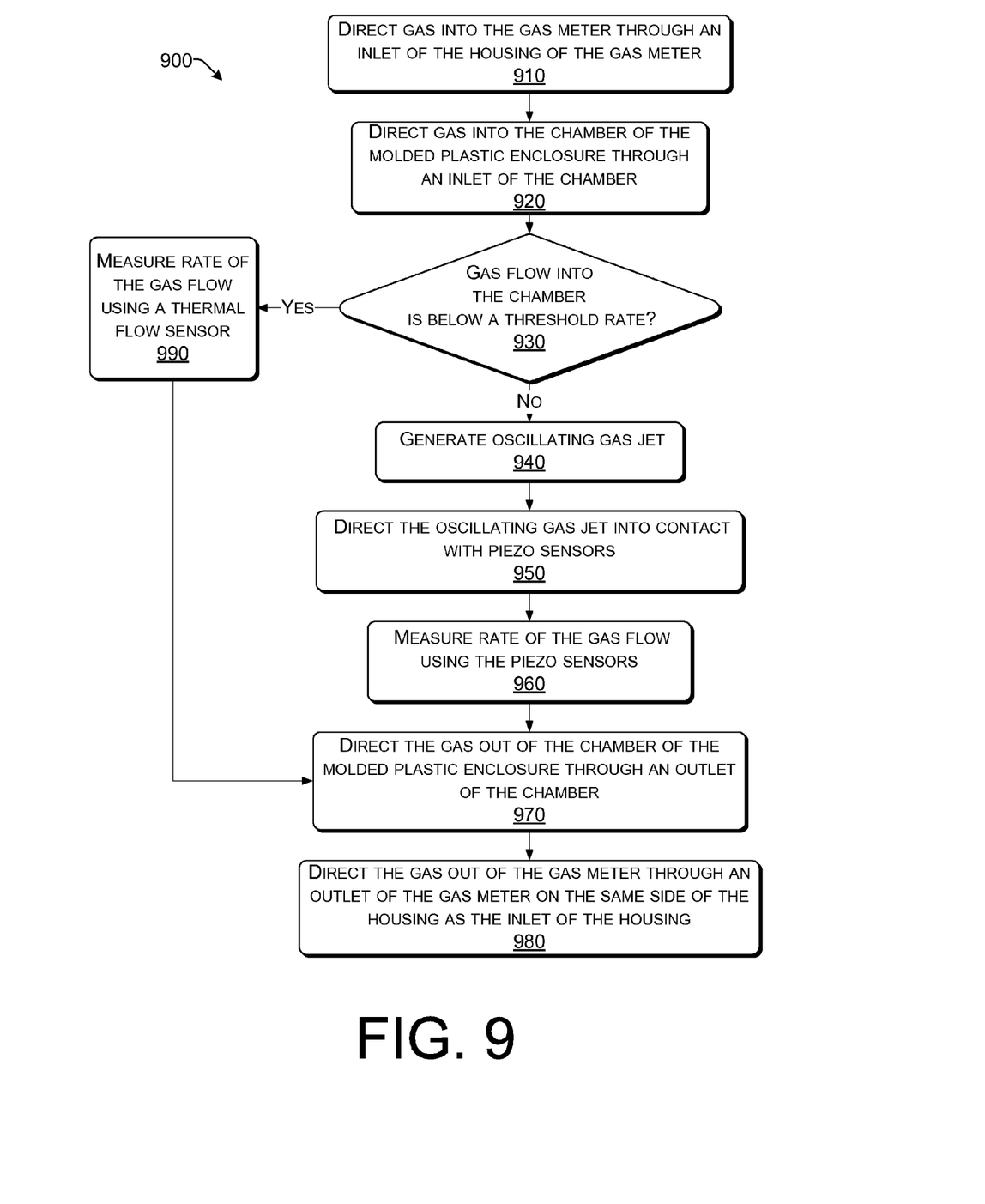
FIG. 9 depicts a flow chart of an exemplary method of detecting flow rate of a gas according to an exemplary embodiment of the present disclosure.

FIG. 9 depicts a flow chart associated with another presently disclosed exemplary method generally 900 of detecting flow rate of a gas. An example of a gas meter that can implement method 900 is meter 800 of FIG. 8. At step 910, gas is directed into the meter 800 through inlet 830. At step 920, the gas is directed into an inlet of chamber 230 (i.e., nozzle 310 of FIG. 3 and FIG. 4). In the example, chamber 230 is inside modular unit 810, which is a molded plastic enclosure.

At step 930, when gas flow into chamber 230 is not below a threshold rate (in other words, the gas flow is at or above the threshold rate), an oscillating gas jet is generated at step 940. For example, the gas sweeps over the surface of obstacle 330 to generate an oscillating gas jet, as discussed for FIGS. 3 and 4. At step 950, the oscillating gas jet is directed into contact with sensors 340, which are piezo sensors in the example. In some examples, sensors 340 may be one or more sensors for detecting the oscillating gas jet and measuring the rate of gas flow. When the oscillating gas jet is directed to a first extreme position, the oscillating jet flow contacts a first piezo sensor and when the oscillating gas jet is directed to a second extreme position, the oscillating jet flow contacts a second piezo sensor, as discussed for FIGS. 3 and 4. At step 960, sensors 340 are used to measure the rate of the gas flow, as discussed for FIGS. 3 and 4.

At step 970, the gas is directed out of chamber 230 of the molded plastic enclosure through outlet 350 of chamber 230. At step 980, the gas is directed out of meter 800 through outlet 840. In the example, outlet 840 is on the same side of housing 820 as inlet 830.

Returning to step 930, if the gas flow is below a threshold rate, flow rate sensor 320 is used to measure the rate of the gas flow at step 990. For example, flow rate sensor 320 can detect a velocity in the gas based on a change in voltage over the surface of flow rate sensor 320. In the example, flow rate sensor 320 is a thermal flow sensor that includes sensing elements that can detect the temperature of the gas and the velocity of the gas. In some examples, sensors 320 may be one or more sensors for measuring the gas flow. In the example, sensors 320 use a different technology than sensors 340. The method then proceeds to steps 970 and 980, as discussed above.

By implementing sensors with two different technologies, meter 800 can make accurate measurements over a wide range of flow rates. Furthermore, the use of modular unit 810 allows for a compact and low-production cost gas meter. In some cases, meter 800 is about a third, or less, of the size of gas meters that use diaphragms. Meter 800 makes more accurate and repeatable measurements than diaphragm meters.

Moreover, meter 800 is more durable than diaphragm meters due fewer or no moving parts. Furthermore, the dual sensing technology combined with the small size of meter 800 allows for meter 800 to measure gas flow as low as about 0.125 ft$^3$/hr.

CONCLUSION

While the presently disclosed subject matter has been described in detail with respect to specific embodiments thereof, it will be appreciated that those skilled in the art, upon attaining an understanding of the foregoing may readily produce alterations to, variations of, and/or equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A gas meter, comprising:
    a housing having an inlet and an outlet;
    a gas measurement module disposed within the housing, the gas measurement module comprising a modular unit including:
        a chamber with an inlet and an outlet;
        an obstacle disposed in the chamber, wherein the obstacle is configured to generate an oscillating gas jet when flow of gas into the chamber is at or above a threshold flow rate; and
        a dual sensing assembly disposed in the modular unit, wherein the dual sensing assembly comprises one or more first sensors using a first gas flow sensing technology and multiple second sensors using a second gas flow sensing technology, wherein the multiple second sensors are disposed in the chamber, and wherein the multiple second sensors comprise a first oscillating gas jet sensor configured to come into contact with the oscillating gas jet at a first time and a second oscillating gas jet sensor configured to come into contact with the oscillating gas jet at a second time in response to movement of the oscillating gas jet.

2. The gas meter of claim 1, wherein the modular unit comprises a molded plastic enclosure.

3. The gas meter of claim 1, wherein the modular unit comprises a cast metal enclosure.

4. The gas meter of claim 1, wherein the inlet is on a same side of the housing as the outlet.

5. The gas meter of claim 1, wherein the housing comprises a cast metal enclosure.

6. The gas meter of claim 5, wherein the cast metal comprises aluminum.

7. The gas meter of claim 1, wherein the one or more first sensors are configured to measure gas flow rates below the threshold flow rate, and the multiple second sensors are configured to measure gas flow rates at or above the threshold flow rate.

8. The gas meter of claim 1, wherein the one or more first sensors comprise a thermal flow sensor to detect a velocity of the gas.

9. The gas meter of claim 1, wherein the multiple second sensors comprise piezo sensors to detect an oscillating frequency of the oscillating gas jet.

10. A gas measurement module for a gas meter, comprising a modular unit, the modular unit including:
    a chamber with an inlet and an outlet;
    an obstacle disposed in the chamber, wherein the obstacle is configured to generate an oscillating gas jet when flow of gas into the chamber is at or above a threshold flow rate; and
    a dual sensing assembly disposed in the modular unit, wherein the dual sensing assembly comprises one or more first sensors using a first sensing technology and multiple second sensors using a second sensing technology, wherein the multiple second sensors are disposed in the chamber, and wherein the multiple second sensors comprise a first oscillating gas jet sensor configured to come into contact with the oscillating gas jet when the oscillating gas jet moves to a first position and a second oscillating gas jet sensor configured to come into contact with the oscillating gas jet when the oscillating gas jet moves to a second position.

11. The gas measurement module of claim 10, wherein the modular unit comprises a molded plastic enclosure.

12. The gas measurement module of claim 10, wherein the modular unit comprises a cast metal enclosure.

13. The gas measurement module of claim 10, wherein the one or more first sensors are configured to measure gas flow rates below the threshold flow rate, and the multiple second sensors are configured to measure gas flow rates at or above the threshold flow rate.

14. The gas measurement module of claim 10, wherein the one or more first sensors comprise a thermal flow sensor to detect a velocity of the gas.

15. The gas measurement module of claim 10, wherein the multiple second sensors comprise piezo sensors to detect an oscillating frequency of the oscillating gas jet.

16. A method for measuring gas flow in a modular unit for a gas meter, comprising:
    directing gas into an inlet of a chamber of the modular unit;
    when gas flow into the chamber is below a threshold flow rate, measuring a rate of the gas flow with one or more first sensors in the chamber that use a first sensing technology;
    when the gas flow into the chamber is at or above the threshold flow rate:
        generating an oscillating gas jet;
        directing the oscillating gas jet to a first position, wherein the oscillating gas jet contacts a first oscillating jet sensor at a first time, and wherein the oscillating gas jet avoids contact with a second oscillating jet sensor at the first time;
        directing the oscillating gas jet to a second position, wherein the oscillating gas jet contacts the second oscillating jet sensor at a second time, wherein the oscillating gas jet avoids contact with the first oscillating jet sensor at the second time, and wherein the first and second oscillating jet sensors use a second sensing technology; and
        measuring a rate of the gas flow with the one or more second sensors; and
    directing gas to an outlet of the chamber of the modular unit.

17. The method of claim 16, wherein the modular unit comprises a molded plastic enclosure.

18. The method of claim 16, wherein the modular unit comprises a cast metal enclosure.

19. The method of claim 16, further comprising:
    directing the gas into the gas meter through an inlet of a housing of the gas meter before directing the gas to the inlet of the chamber and directing the gas out of the gas meter through an outlet of the housing of the gas meter after directing the gas to the outlet of the chamber, wherein the inlet of the housing is on a same side of the housing as the outlet of the housing.

20. The method of claim 16, wherein the one or more first sensors comprise a thermal flow sensor to detect a velocity of the gas and the first and second oscillating jet sensors comprise piezo sensors to detect an oscillating frequency of the oscillating gas jet.

* * * * *